United States Patent [19]
Zittel

[11] Patent Number: 5,632,195
[45] Date of Patent: May 27, 1997

[54] FOOD PROCESSING APPARATUS WITH NON-STRAIGHT LIFTING AND AGITATING BAFFLES

[76] Inventor: David R. Zittel, 155 Oak Grove Dr., Columbus, Wis. 53925

[21] Appl. No.: 710,177

[22] Filed: Sep. 13, 1996

[51] Int. Cl.⁶ .................... A23L 3/00; A23N 12/00; A47J 37/12; F25D 25/02
[52] U.S. Cl. ................... 99/348; 99/404; 99/409; 99/443 C; 99/516; 134/65; 134/132; 366/81; 366/234; 366/319
[58] Field of Search ............... 99/348, 352–355, 99/360, 365, 403, 404, 409, 443 C, 443 R, 470, 516, 517, 534, 536, 477–479; 366/81, 91, 101, 102, 234, 290, 318, 319, 322, 324; 134/65, 132; 62/381; 100/117, 145

[56] References Cited

U.S. PATENT DOCUMENTS

| | | | |
|---|---|---|---|
| 3,924,839 | 12/1975 | Millauer | 366/319 X |
| 4,092,015 | 5/1978 | Koch | 366/81 |
| 4,627,735 | 12/1986 | Rose et al. | 366/81 |
| 4,688,476 | 8/1987 | Zittel | 99/403 |
| 4,875,344 | 10/1989 | Zittel | 62/381 |
| 4,942,810 | 7/1990 | Zittel et al. | |
| 5,133,249 | 7/1992 | Zittel | 99/516 X |
| 5,146,841 | 9/1992 | Zittel | 134/65 X |
| 5,327,817 | 7/1994 | Zittel | 99/404 X |
| 5,329,842 | 7/1994 | Zittel | 99/409 X |
| 5,341,729 | 8/1994 | Zittel | 366/81 X |
| 5,427,015 | 6/1995 | Zittel | 366/234 X |
| 5,429,041 | 7/1995 | Zittel | 134/132 X |
| 5,456,091 | 10/1995 | Zittel | 62/375 |

*Primary Examiner*—Timothy F. Simone
*Attorney, Agent, or Firm*—Nilles & Nilles, S.C.

[57] ABSTRACT

A food processing apparatus having a tank with an inlet and an outlet, a liquid bath received therein, a rotary auger having a plurality of spaced apart flights for urging food product toward the outlet, and a baffle between a pair of adjacent auger flights for lifting and/or agitating (1) food product and (2) the liquid for increasing heat transfer between the liquid and food product, with the baffle being of substantially non-straight construction for minimizing the force of impact between food product and the baffle. Each baffle has a leading portion and a trailing portion with at least one of the portions being of non-straight construction. Preferably, each baffle has at least one bend or curve for minimizing impact force. The bend or curve is adjacent the leading portion of the baffle, which is that portion of the baffle that typically first comes into contact with food product during operation. In one preferred embodiment, the baffle is of generally S-shaped construction having a leading portion with a concave food product contacting surface followed by a trailing portion with a convex food product contacting surface. A baffle can have outwardly extending, spaced apart rods to help separate food product coming into contact with a baffle. Spaced apart rods can also radially inwardly extend from a drum enclosing the auger.

47 Claims, 8 Drawing Sheets

FOOD PROCESSING APPARATUS WITH NON-STRAIGHT LIFTING AND AGITATING BAFFLES

FIELD OF THE INVENTION

The present invention relates to a heat transfer enhancing apparatus for a liquid bath type food processing device and more particularly to a lifting or agitating baffle of non-straight construction for improving heat transfer between food product and a liquid bath in a tank of the food processing device, all while minimizing impact of the food product against the baffle.

BACKGROUND OF THE INVENTION

Food products, such as pasta, beans, corn peas, other fruits and vegetables, and other types of food products, are processed by blanching or cooking and thereafter cooling then so that the food product can be packaged and shipped. These food products are processed continuously in this manner in rather large volumes in the commercial food processing industry using blanchers and chillers or coolers.

In blanching or cooking food product, food product is introduced into an inlet end of a tank containing heated water and a rotating auger transports the food product toward an outlet or discharge end. As the food product moves from the inlet end of the tank toward the outlet end, its residency time in the tank is carefully controlled to ensure it is properly blanched or cooked.

In cooling or chilling food product, food product is introduced into an inlet end of a tank containing cold or chilled water and a rotating auger urges the food product toward an outlet end. As the food product moves from the inlet end toward the outlet end, its residency time is also carefully controlled to ensure the food product is adequately cooled to a desired temperature.

To increase the volume of food product that can be processed, as well as decrease the residency time within the blancher or the chiller, various mechanisms and methods have been employed to increase the rate of heat transfer between the water and the food product. These heat transfer efficiency enhancing mechanisms and methods can also advantageously enable the size of the food processing equipment to be reduced thereby saving valuable manufacturing floor space.

For example, in Zittel, U.S. Pat. No. 4,875,344, cold or chilled water is introduced into the tank at the outlet end and removed from the tank at the inlet end, creating a flow of water that is opposite in direction to the direction of the flow of food product in the tank for improving cooling efficiency. To further improve cooling efficiency, air manifolds at the bottom of the tank introduce air into the cold water inside the tank to help mix and prevent temperature stratification of the water. As air bubbles upwardly from the tank bottom, it creates turbulence in the water and agitates the water and food product further enhancing heat transfer between the food product and water.

As disclosed in Zittel, U.S. Pat. No. 5,133,249, steam and air are selectively injected into water in the tank from a manifold at the bottom of the tank of a blancher to increase heat transfer between the food product and water, speeding cooking time and also increasing the flow rate of food product through the blancher.

Another mechanism for improving heat transfer in both blanchers and coolers and chillers is lifting or agitating baffles disclosed in Zittel, U.S. Pat. Nos. 4,875,344; 5,133,249; 5,327,817; and 5,456,091. These baffles are located between adjacent flights of the auger and engage and lift food product as the auger rotates thereby agitating the food product. As is shown more clearly in FIG. 6 of U.S. Pat. No. 5,327,817, each baffle located between adjacent auger flights is of planar or straight construction and extends radially inwardly from adjacent a radially outwardly located perforated cylinder screen. At its radially inwardly extending end, each baffle has a downturned straight lip for helping to prevent food product from falling between the baffle and screen. To further help agitate food product, FIG. 6 also discloses straight agitating baffles that extend radially outwardly from a central core of the auger.

Additionally, it is known to attach elongate rods that extend outwardly from a baffle for separating food product to more fully immerse the food product in the water in the tank. By more fully immersing the food product in the water, heat transfer efficiency is improved.

Although both of applicants' baffle arrangements described above have enjoyed substantial commercial acceptance and success, improvements nonetheless remain desirable. For example, certain kinds of food product, such as pouched food products, are more susceptible to being damaged by impact with another object, such as a lifting or agitating baffle. Additionally, it is always desirable to further increase heat transfer to or from food product by baffle agitation or by separating food product.

What is needed is a baffle construction that minimizes the force of impact with food product or pouched food product for minimizing and substantially preventing food product and pouch damage. What is also preferably needed is a baffle construction that agitates food product, as well as the water in the tank, for helping to maximize heat transfer efficiency.

SUMMARY OF THE INVENTION

A food processing apparatus having (a) a tank with an inlet end and an outlet end, (b) a bath containing a heat transfer liquid received in the tank, (c) a food product transport mechanism received in the tank and in contact with the liquid bath for urging food product received in the tank toward the outlet end, and (d) a plurality of baffles connected to the food product transport mechanism for lifting and/or agitating (1) food product and (2) the liquid bath for increasing heat transfer between the liquid and food product, with each baffle being of substantially non-straight construction for minimizing the force of impact between food product and the baffle.

Preferably, a baffle of this invention is made up of two portions with at least one of the portions being of non-straight construction. Preferably, the baffle can be constructed having a first non-straight portion and a second non-straight portion. Preferably, each baffle has at least one bend or curve for minimizing impact force with a piece of food product or pouch coming into contact with the baffle. Preferably, the bend or curve is adjacent a leading portion of the baffle, which is that portion of the baffle that typically first comes into contact with food product in the tank.

The tank of the food processing apparatus has a sidewall and a pair of end walls connected to form a fluidtight reservoir for receiving a heat transfer liquid therein that preferably is water or another suitable heat transfer liquid that can also contain at least some water. The tank, as well as the entire food processing apparatus, is supported by a frame that has legs which rest upon the ground. The tank preferably has inlets for enabling the tank to be filled with heat transfer liquid and outlets for enabling the tank to be drained and cleaned. To enable the apparatus to have heating stages, cooling stages, or a combination of heating and cooling stages, the tank can be constructed with dividing walls that divide the tank into segments.

The drum includes a generally cylindrical sidewall that is rotatably received in the tank. The drum has an inlet end plate at the inlet end and an outlet end plate at the outlet end, with both end plates having an opening for allowing food product to pass through. The drum sidewall is of generally perforate construction for allowing heat transfer liquid in the tank to enter the drum to contact the food product in the drum to heat and/or cool the food product while preventing the food product, debris and other particulate matter within the drum from passing through the drum sidewall into an envelope between the drum and tank. To reinforce the drum and improve its structural rigidity, the drum endplates are connected by a plurality of support channels. Perforate panels preferably extend between support channels to help form the sidewall. The panels and support channels are preferably constructed and arranged to permit easy removal of the panels for cleaning and performing maintenance.

To facilitate rotation of the drum, each end plate has an axially outwardly extending flange forming a journal surface that is supported by the frame by preferably riding upon trunnions carried by the frame. To rotate the drum, one of the end plates has a sprocket that is connected by an endless flexible member to a prime mover that preferably is a motor.

The food transport mechanism comprises an auger received in the drum that is formed from a plurality of generally axially spaced apart flights constructed and arranged to form a helical food product urging surface. The auger is rotatably received in the tank and rotates during operation to urge food product received in the drum toward the outlet end of the tank. Preferably, portions of the outer radial peripheral edge of each auger flight are affixed to support channels of the drum to mutually strengthen the drum and auger and to cause the auger to rotate substantially in unison with the drum.

In one auger embodiment capable of being used with the baffles of this invention, the auger is of coreless construction. In another suitable auger embodiment, the auger flights are supported on an elongate and generally cylindrical core. Preferably, at least a portion of the inner radial edge of each auger flight is affixed to the core, such as by welding or the like.

The baffle of this invention is received between a pair of adjacent auger flights and generally orbits about a rotational axis of the auger to lift and agitate food product and heat transfer liquid within the drum. In one preferred baffle embodiment, the baffle extends from one adjacent auger flight to the other adjacent auger flight and is affixed to one of the adjacent flights. Preferably, the baffle is affixed to both adjacent auger flights.

In another baffle embodiment, the baffle extends axially outwardly from an adjacent auger flight, but terminates short of the other adjacent auger flight or an adjacent baffle attached to the other adjacent flight. Preferably, each such baffle is affixed to one of the adjacent auger flights.

In one baffle orientation, the baffle extends generally radially inwardly from adjacent an outer radial edge of an adjacent auger flight generally toward the rotational axis of the auger. Preferably, the baffle extends generally radially inwardly toward the auger axis but terminates short of the axis with sufficient space to allow food product to pass between the inner radial edge of the baffle and the axis or a core of the auger, if the auger has a core. Preferably, space between the outer radial edge of each baffle and the drum sidewall is minimized for preventing food particles from being trapped therebetween and also for preventing damage to food product. Preferably, there is virtually no space between the outer radial edge of each baffle and the drum sidewall.

In one preferred baffle construction, the baffle has a length of at least about four inches and preferably at least about twelve inches. The baffle extends from side to side between a pair of adjacent auger flights and therefore has a width that is substantially the same as the distance between two adjacent auger flights. Preferably, the baffle has a width of at least about four inches. Typically, the baffle has a thickness of at least about 0.125 inches. Preferably, the baffle can be constructed with a downturned lip at its free end.

In another baffle orientation, the baffle extends radially outwardly from adjacent the inner radial edge of an adjacent auger flight toward the drum sidewall. If the auger is carried by a core, the space between the inner radial edge of each baffle and the core is minimized. Preferably, there is virtually no space between the inner radial edge of each baffle and the core.

Preferably, each baffle is generally inclined in a direction opposite the direction of auger rotation. Preferably, each baffle is oriented such that a longitudinal axis of the baffle is acutely inclined or canted relative to a tangent to the direction of auger rotation. Each baffle is acutely inclined at an angle of at least about 10° and no greater than about 80°. For most applications, each baffle is acutely angled between about 30° and about 60°.

Each baffle of this invention has a first portion and a second portion with one of the portions being of substantially non-straight, non-planar or three dimensionally contoured construction. In one preferred baffle embodiment, the baffle is of generally S-shaped construction having a concavely shaped leading contact surface and a convexly shaped trailing contact surface.

Preferably, each baffle has a leading portion, that typically comes into contact first with food product in the drum, and a trailing portion that follows the leading portion. The leading portion is curved or bent for helping to minimize the force of impact of the baffle with a piece of food product in the path of the baffle. The curved or bent portion also helps to controllably accelerate food product that has come into contact with the baffle to agitate the food product for increasing the rate of heat transfer between the food product and heat transfer liquid surrounding the food product.

Initially, food product coming into contact with a baffle of this invention is gently accelerated due to the curved shape of the baffle, minimizing impact force. Upon coming into contact with the baffle, the direction of the food product is altered such that its motion is generally parallel to the contact surface of the baffle to minimize impact force. After the direction of the food product has been suitably altered, the slope or curvature of the baffle is increased to more quickly accelerate the food product along the baffle to cause heat transfer enhancing agitation. Before or while the food product is leaving contact with the baffle, the trailing portion preferably causes the food product to tumble or roll further agitating the food product.

To help separate pieces of food product from other pieces of food product, a baffle of this invention can be equipped with elongate generally cylindrical rods that extend outwardly from the baffle. To further separate pieces of food product from other pieces of food product, the inner radial surface of the drum sidewall can be equipped with such rods.

Objects, features and advantages of this invention are to provide a baffle for a food processing apparatus that increases heat transfer between liquid and food product in the apparatus; agitates both food product and the heat transfer liquid surrounding the baffle to improve heat transfer; introduces a tumbling action to food product contacting the baffle to help agitate the food product to improve heat transfer to or from the food product; improves heat transfer efficiency enabling smaller and shorter food processing apparatuses to be constructed that process the same or a greater amount of food product per hour; can easily be retrofitted to existing coolers, chillers and blanchers to improve their heat transfer efficiency; improves heat transfer to food product in the drum by helping to "dunk" the product to help make sure that the food product is fully immersed in liquid; minimizes the force of impact between a piece of food product and a baffle for minimizing and substantially preventing damage to food product; minimizes impact force to allow types of food product and other delicate goods to be continuously processed that otherwise could not be mass processed by such a processing apparatus having a rotary auger; minimizes impact to prevent pouches containing food product from bursting when they contact a baffle; and is a baffle that is rugged, simple, flexible, reliable, and durable, and which is of economical manufacture and is easy to assemble and use.

BRIEF DESCRIPTION OF THE DRAWINGS

These and other objects, features, and advantages of this invention will become apparent from the following detailed description of the best mode, appended claims, and accompanying drawings in which:

DETAILED DESCRIPTION OF THE INVENTION

I. Introduction

Figure 1:
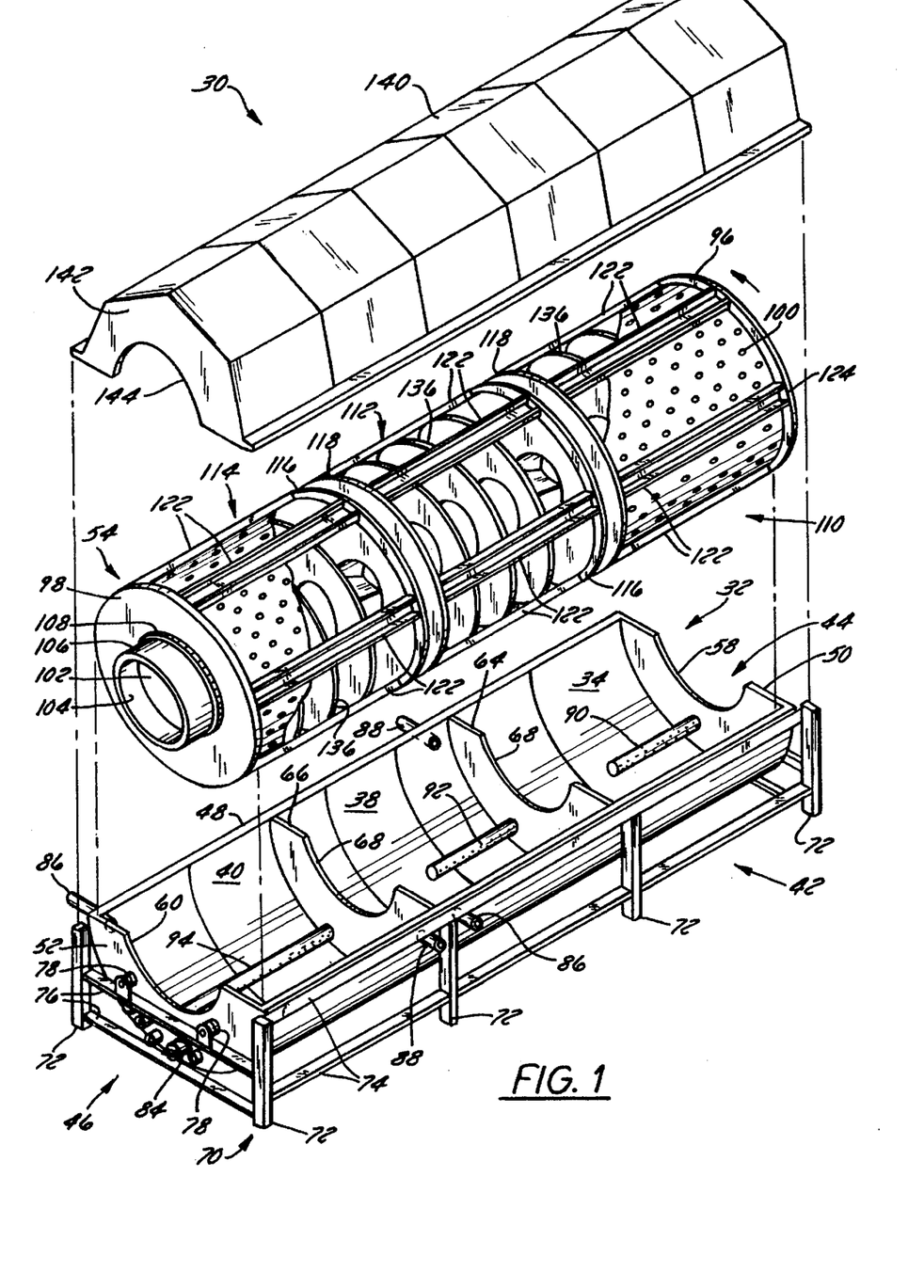
FIG. 1 is an exploded perspective view of a food processing apparatus with part of a drum sidewall missing to illustrate the construction and arrangement of lifting baffles of this invention.
Figure 2:
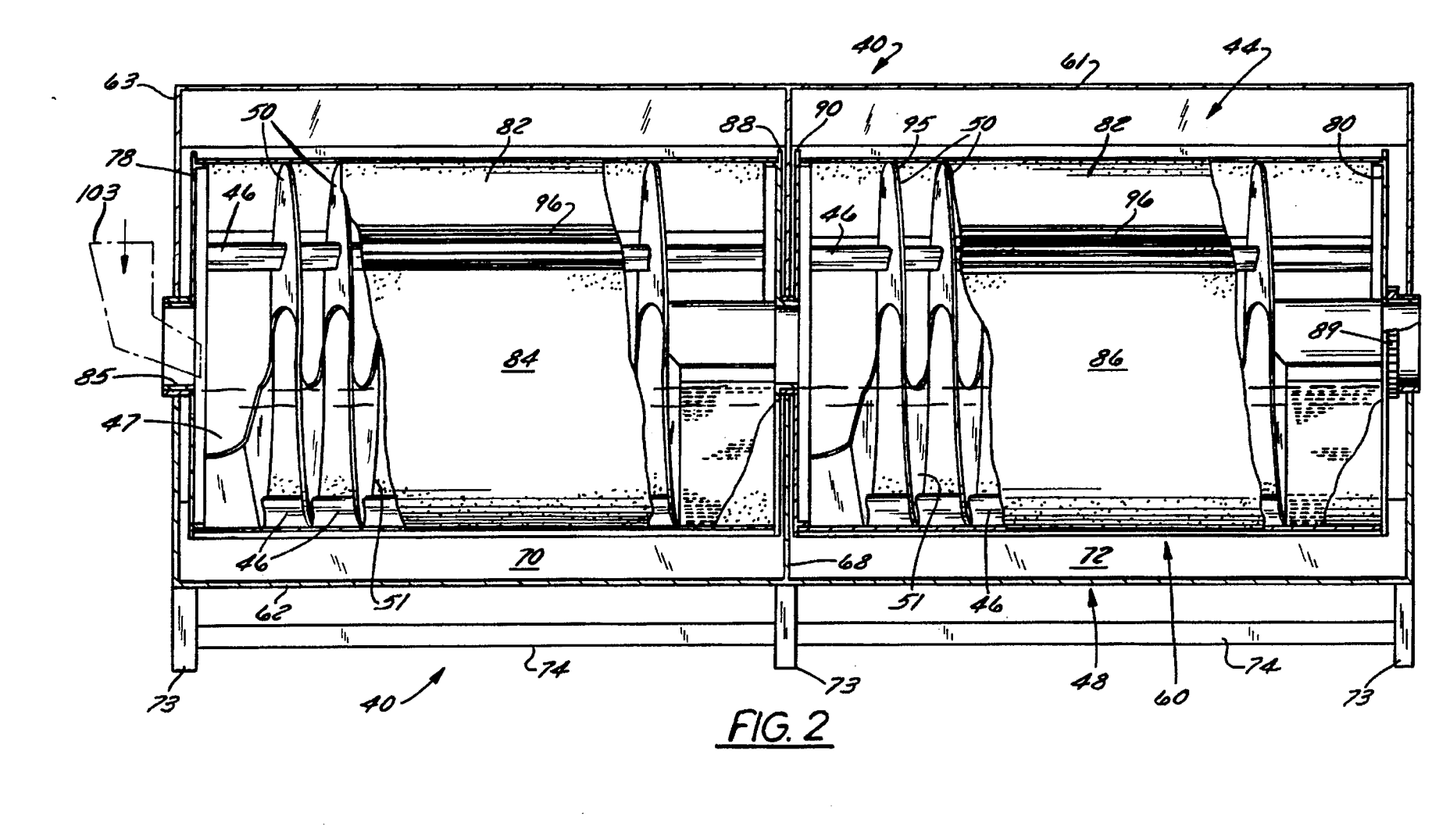
FIG. 2 is a side sectional view of a food processing apparatus of coreless construction with portions of the drum sidewall missing for clarity to show the lifting baffles of the invention.
Figure 3:
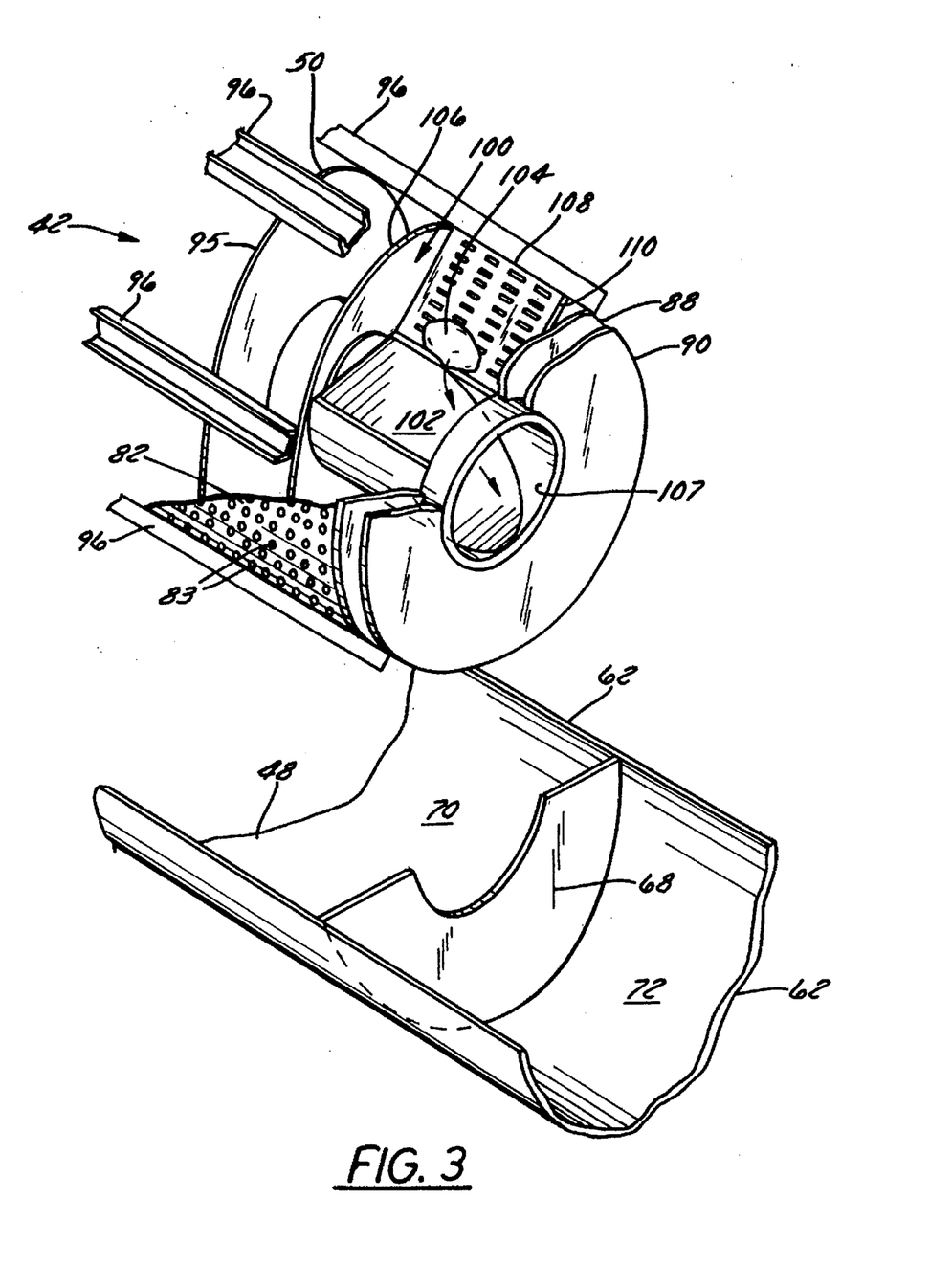
FIG. 3 is a fragmentary perspective view of a dividing wall dividing a tank of the food processing apparatus into compartments and a transfer assembly for transferring food product from one tank compartment to another tank compartment.

FIGS. 1–3 illustrates a food processing apparatus 40 for cooking and cooling food product having a food transport mechanism 42 that preferably is a rotating generally helical auger 44 carrying a plurality of non-straight baffles 46 that relatively gently lift and/or agitate the food product to increase heat transfer to and from the food product while minimizing and preferably substantially preventing damage to the food product during agitation. As is shown in FIG. 1, the food processing apparatus 40 has a tank 48 for receiving a bath 49 of hot or cold liquid into which the food product is immersed during operation. To urge food product received in the tank 48 from one end of the tank 48 toward the other end of the tank 48, the auger 44 is received in the tank 48 and has a plurality of spaced apart flights 50 constructed and arranged to form a generally helical food product urging surface 51 (FIG. 2).

In a preferred embodiment of the food processing apparatus 40, there are baffles 46 between adjacent auger flights 50 that engage and agitate food product during operation while preferably creating heat transfer enhancing turbulence in the liquid bath 49. As is shown more clearly in FIGS. 4, 5A, 5B, 8, 9 & 12, each baffle 50 is of non-straight construction and is constructed and arranged to minimize the force of any impact with food product while agitating the food product and liquid to increase heat transfer between the food product and the liquid bath 49.

In one preferred baffle embodiment, the baffle 50 has a first portion 52 and a second portion 54 with one of the portions of the baffle 50 being of non-straight construction. Preferably, one of the portions 52 or 54 of the baffle 50 is of generally curved construction for minimizing impact force while maximizing agitation and turbulence.

II. Food Processing Apparatus

Referring to FIGS. 1 & 2, the food processing apparatus 40 has a tank 48 with an inlet end 56 and an outlet end 58. Rotatably received in the tank 48 is a drum 60 through which food product passes during operation. The food transport mechanism 42 is preferably received within the drum 60 and is constructed and arranged to urge food product received in the drum 60 toward the outlet end 58 of the tank 48.

The tank 48 is formed by a sidewall 62 of generally arcuate or curvilinear cross section (FIG. 1) that preferably can be segmented (FIG. 12), and has an inlet end wall 64 at one end and an outlet end wall 66 at the opposite end. To help facilitate entry and removal of food product, the inlet end wall 64 has a tank inlet opening 67 and the outlet end wall 66 has a tank outlet opening 69. So that the tank 48 can hold a liquid at two different food processing temperatures, there can be a dividing wall 68 between the inlet end wall 64 and the outlet end wall 66 that divides the tank 48 into two tank compartments 70 & 72.

Each compartment 70 & 72 of the tank 48 has inlets and outlets to allow liquid to be introduced into the tank compartment and to remove or drain liquid from the compartment. For example, liquid can be introduced into each tank compartment via an external manifold (not shown) that has one or more ducts which branch from the manifold to the interior of the tank compartment. Alternatively, liquid can be introduced into each tank compartment in another manner. To drain each tank compartment 70 & 72, each compartment is preferably equipped with a clean out access opening or drain 75 that is blocked during operation.

To help promote heat transfer between food product and liquid in a tank compartment, each tank compartment 70 & 72 can be constructed with one or more internal manifolds 77. During operation, air, compressed air, or steam can be introduced into a tank compartment 70 or 72 through such a manifold 77 to directly effect heat transfer, to promote turbulence of the liquid bath 49 within the tank compartment, and to agitate the food product within the tank compartment, all for enhancing heat transfer.

Where a tank compartment 70 and/or 72 is used for heating food product, air, compressed air and/or steam can be introduced into a tank compartment through such a manifold 77 in the compartment. Where a tank compartment 70 and/or 72 is used for cooling or chilling food product, air or compressed air can preferably be introduced into the compartment through such a manifold 77 to improve food product cooling. If desired, liquid can be introduced into a tank compartment using such a manifold.

Preferably, the heat transfer liquid forming the bath 49 of each tank compartment 70 and 72 is water. Where food product is to be heated or preheated in a tank compartment, the water in the tank compartment has a temperature of at least about 80° Fahrenheit. Where blanching or cooking of food product is to be performed, the water has a temperature preferably between about 160° Fahrenheit and about 210° Fahrenheit.

Where food product is to be cooled or chilled, the temperature of water in a cooling or chilling tank compartment preferably is no greater than about 80° Fahrenheit. Where cooling or pre-cooling of food product is to be performed, the water temperature is preferably between about 50° F. and about 70° F. Where chilling of food product is to be done, the water temperature is preferably between about 32° Fahrenheit and about 50° Fahrenheit.

Although water is preferably used as a heat transfer liquid for both heating and cooling applications, another liquid can be used for effecting heat transfer. For example, for cooling applications, brine or ethylene glycol can be used as the heat transfer liquid.

The tank 48 shown in FIGS. 1 & 2 has two tank compartments 70 & 72 for holding water having two different temperatures. For the purpose of showing that the lifting and agitating baffles 46 of this invention work well in both heating and cooling applications, the inlet end tank compartment 70 has a bath of hot water for heating food product and the outlet end tank compartment 72 has a bath of cold water for cooling or chilling food product. However, the compartments 70 & 72 can also be used for pre-heating and blanching, or pre-cooling and chilling food product, if desired. If desired, the food processing apparatus 40 can be constructed with more than two tank compartments where food processing using more than two different temperature zones is required.

The tank 48 is carried by a support frame 74 that has legs 71 which rest upon the ground. Adjacent the inlet end 56 and outlet end 58 of the tank 48, the support frame 74 has cross members 71. To facilitate rotation of the food auger 44, and preferably also the drum 60, each uppermost cross member 71 has a pair of spaced apart trunnions 76 located adjacent the tank inlet opening 56 and the tank outlet opening 58.

Figure 7:
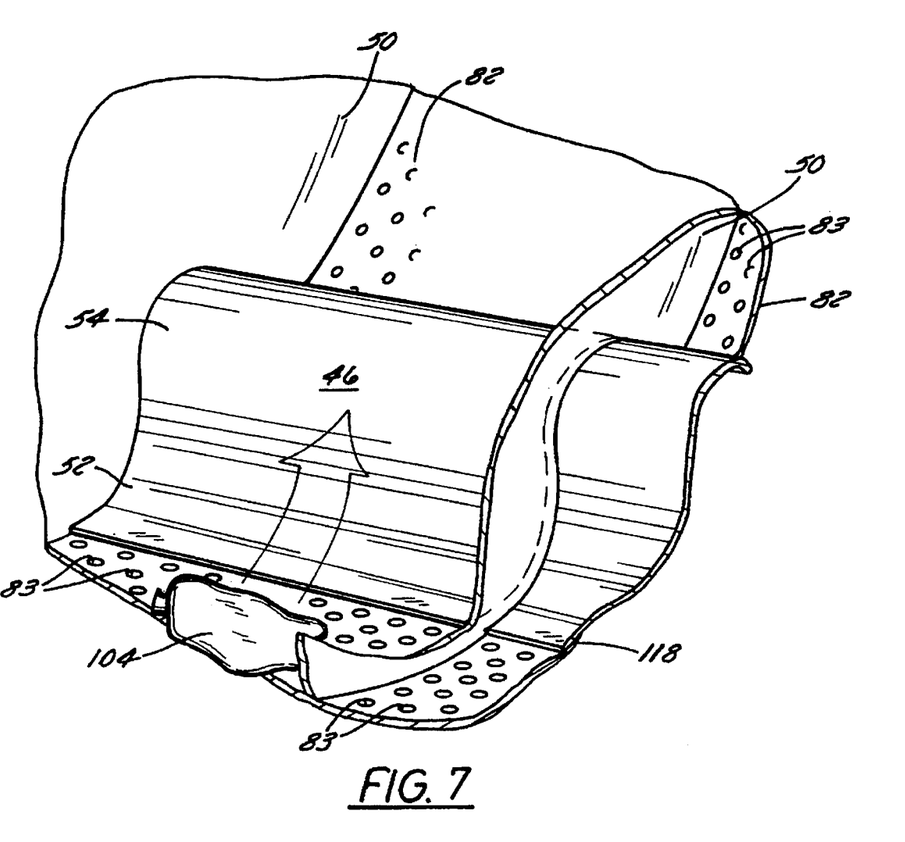
FIG. 7 is an enlarged perspective view of a lifting baffle of this invention illustrating the action of food product contacting the baffle and moving along the baffle.
Figure 10:
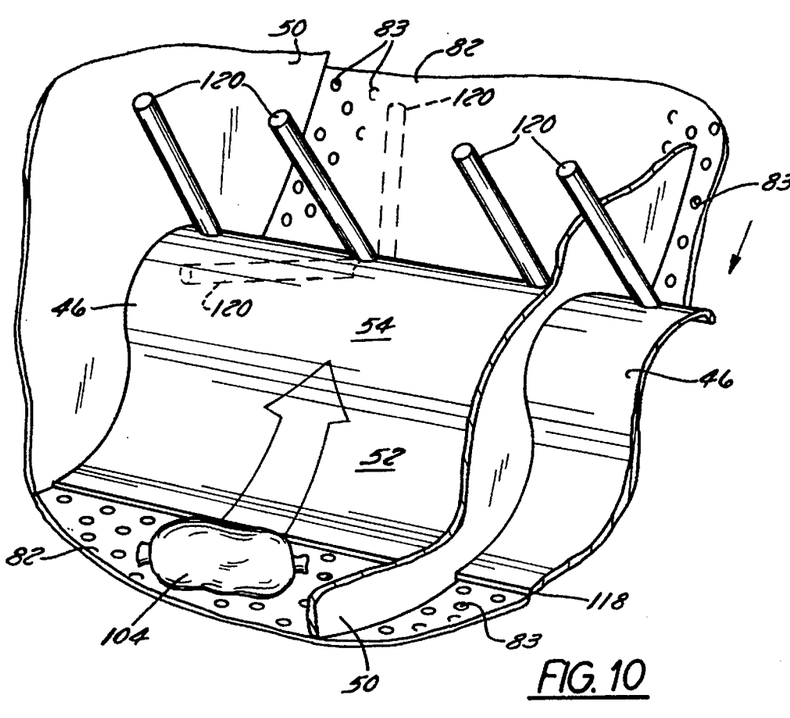
FIG. 10 is an enlarged fragmentary perspective view of a lifting baffle of this invention with spaced apart elongate rods extending outwardly from the baffle to help separate food product from other food product.

The drum 60 is an elongated cylinder having an inlet end plate 78, an outlet end plate 80, and a sidewall 82 extending axially between the end plates. To allow water from the tank 48 to enter the drum 60, the drum sidewall 82 preferably has one or more through-openings 83 (FIGS. 7 & 10). To permit water to enter the drum 60 while preventing food product and debris within the drum 60 from passing through the drum sidewall 82 into the region between the drum 60 and the tank 48, the drum sidewall 82 is preferably perforated.

The drum 60 has an inlet end drum segment 84 received in the inlet end tank compartment 70 and an outlet end drum segment 86 received in the outlet end tank compartment 72. Adjacent the dividing wall 68 of the tank 48, the inlet end drum segment 84 has a dividing wall outlet end plate 88 and the outlet end drum segment 86 has a dividing wall inlet end plate 90. All of the end plates 78, 80, 88 & 90 have a through opening 85 to allow passage of food product.

The inlet end plate 78 and outlet end plate 80 have an axially outwardly extending flange 92 that extends about the periphery of its food passage through-opening 85 and which defines a journal surface 94 for facilitating rotation of the drum 60. When the drum 60 is received in the tank 48, the journal 94 of the inlet end plate 78 rides upon an adjacent pair of trunnions 76 to facilitate drum rotation.

To rotate the auger 44 and drum 60, there is a prime mover (not shown) that preferably is a motor, such as an electric motor, a hydraulic motor, or the like, that is operably connected to a drive sprocket 89 (FIG. 2) on the drum 60 by an endless flexible member (not shown) that preferably is a belt, a chain, or the like. Preferably, the auger 44 of both drum segments 84 & 86 rotates in unison during operation, preferably because the drum segments 84 & 86 are coupled to each other. If desired, the auger 44 of each drum segment 84 & 86 can be independently rotated.

To cause both drum segments 84 & 86 to rotate in unison, the dividing wall end plates 88 & 90 of the drum segments are joined by a connecting tube 87 (FIG. 3) and can be rotatively supported on the dividing wall 68 itself or on trunnions (not shown) carried by the wall 68.

If the drum 60 is constructed and arranged to permit the drum segments 84 & 86 to rotate independently of each other, the dividing wall end plates of each drum segment each have an axially outwardly extending journal surface that preferably is rotatably supported, such as by trunnions or the like. To permit relative rotation of the drum segments 84 & 86, the journals are not connected to each other and the dividing wall end plates are not connected to each other. Preferably, the trunnions rotatively supporting each journal are affixed to or carried by the dividing wall 68.

To enhance the strength of and help provide structural rigidity to the drum 60, the outer end plates 78 & 80 and dividing wall end plates 88 & 90 are connected by axially extending support channels 96. As is shown FIG. 1, the inlet end drum segment 84 has a plurality of spaced apart support channels 96 that connect the inlet end plate 78 to the diving wall outlet end plate 88. Likewise, the outlet end drum segment 86 has a plurality of spaced apart support channels 96 that connect the outlet end plate 80 to the dividing wall inlet end plate 90.

The end of each channel 96 preferably is affixed to an end plate such as by welding. Preferably, the channels 96 are connected to the radially outermost peripheral edges of the end plates 78, 80, 88 & 90. While each channel 96 can be welded directly to a flat portion of the end plate, each end of each channel 96 is preferably welded to an axially inwardly extending lip of an adjacent end plate. In addition to serving as a mounting surface for the channels 96, each lip also advantageously makes the drum 60 stronger and preferably more structurally rigid.

The perforated drum sidewall 82 is preferably comprised of a plurality of perforate plates or panels that extend between adjacent support channels 96 to produce a generally continuous cylindrical drum sidewall 82 of perforate construction. Each perforate drum sidewall panel and support channel is preferably constructed and arranged to permit removal of the panel to facilitate cleaning of the drum 60 and panel, as well as for providing service access to the interior of the drum 60.

It should be noted that the perforated drum sidewall 82 illustrated in FIGS. 1–12 have been depicted with the relative dimensions of the perforations exaggerated for clarity. Preferably the size, construction and arrangement and density of the perforations in the drum sidewall 82 are selected to allow the liquid in the tank 48 to enter the drum 60 while retaining food product, food particles, other debris and other solid objects within the drum 60.

Each of the components of the drum 60, including the perforate sidewall 82, support channels 96 and end plates 78, 80, 88 & 9t), are preferably constructed of a material that is strong, durable, corrosion resistant and easy to clean. Preferably each of the components of the drum 60 can be constructed of a stainless steel or another similarly durable, strong, corrosion resistant and easy to clean metallic or nonmetallic material.

Overlying the drum 60 is a cover 61 that mates with the top surface of the tank sidewall 82 and cooperates with the tank 48 to substantially completely enclose the drum 60 during operation. Preferably, the cover 61 is hingedly connected to the tank 48 so it can be swung away from the drum 60 to permit access to the drum 60 and the interior of the tank 48. Preferably, the cover 61 has a pair of sidewalls 63, each with an opening 65 complementary with the drum journal 94 for facilitating drum rotation. If desired, the cover 61 can be of vaulted or segmented construction, such as is depicted in FIG. 1.

III. Food Transport Mechanism

The food transport mechanism 42 is received within the drum 60 and urges food product entering the drum 60 from the inlet end 78 of the drum 60 toward the outlet end 80 of the drum 60. Preferably, the food transport mechanism 42 includes an auger 44 having a plurality of axially spaced apart auger flights 50 that are connected and constructed and arranged to form a generally helical food product urging surface 51. During operation, the auger 44 is rotated to urge food product entering the drum 60 from the inlet end 56 toward the outlet end 58.

Portions of the outer radial peripheral edge 95 of the auger flights 50 are operably connected to the support channels 96 preferably by being directly affixed to the channels. Preferably, the auger flights 50 are welded to the support channels 96 where they engage or bear against the channels 96. As a result, the auger 44 is substantially supported by the channels 96 as well as also the end plates 78, 80, 88 & 90.

Due to this construction, the auger 44 rotates substantially in unison with the drum 60. If desired, the auger 44 and drum 60 can be constructed and arranged such that the auger 44 rotates independently of the drum 60 such that there is relative rotation between the auger 44 and the drum 60. Preferably, the auger 44 rotates in unison with the drum 60.

If desired, the auger flights 50 can be carried by a core 98, such as shown in FIG. 3, for providing more strength and structural stability to the auger 44, particularly for allowing (1) longer drums 60 and tanks 48 and (2) larger diameter drums 60 to be constructed. Inner radial peripheral edges 97 of the auger flights 50 are welded to the core 98. Preferably, the core 98 is generally coaxially received within the drum 60 and the core 98 and auger 44 have an axis of rotation 99 (FIG. 4) that generally coincides with an axis of rotation 99 of the drum 60.

Preferably, each drum segment 84 & 86 has an auger 44 for transporting food product from the inlet end of the drum segment toward the outlet end of the drum segment. As is shown in FIG. 3, between drum segments 84 & 86 them is a food product transfer assembly 100 for transferring food product from one segment 84 to the next segment 86. Although not shown, there is another food product transfer assembly of like construction at the outlet end 58 of the tank 48 for discharging food product from within the last drum segment 86 out the outlet 69.

As is shown in FIG. 3, the food product transfer assembly 100 has a discharge chute 102 for receiving food product 104 from one drum segment and transferring it to the next drum segment. The chum 102 is preferably located between an axially adjacent auger flight 106 and the outlet opening 107 in the dividing wall end plate 88. The chute 102 is an inclined surface adjacent the outlet that is downwardly canted toward the outlet opening 107 so that food product 104 received on the chute 102 will slide down the chute 102 and out the outlet 107.

To lift food product out of water within the drum segment 84 and transfer it to the chute 102, a preferred embodiment of the discharge assembly 100 has a single lifting flight 108 that extends radially inwardly from the drum sidewall 82 toward the chute 102. The lifting flight 108 preferably comprises a perforated base plate 110 that is preferably welded to a portion of the chute 102. As is depicted in FIG. 3, during rotation of the auger 44, the lifting flight 108 lifts food product 104 from the water bath 49 and deposits the food product 104 on the chute 102 where it slides down the chute 102 and out the outlet 107. Alternatively, more than one lifting flight can be used to transfer food product 104 to the discharge chute 102.

IV. Lifting Baffles

Figure 4:
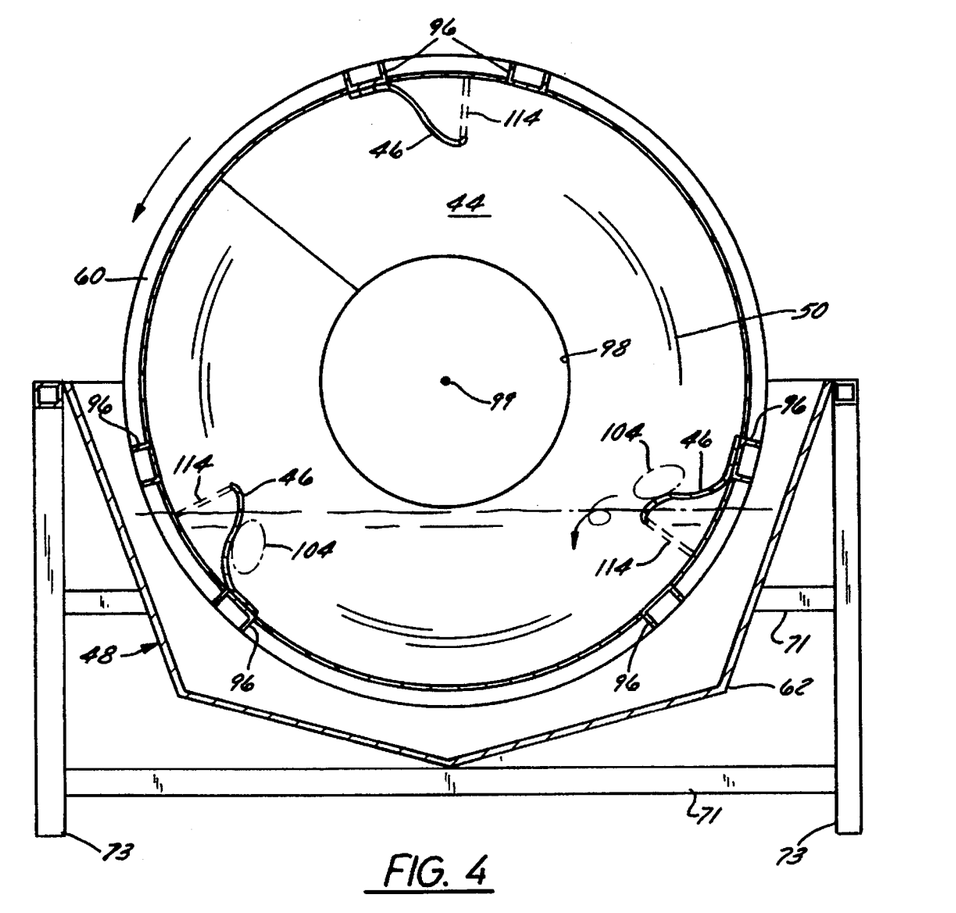
FIG. 4 is a cross section of the food processing apparatus illustrating the cross section of a preferred embodiment of the lifting baffles and their arrangement within a drum rotatably received in the tank.
Figure 5A:
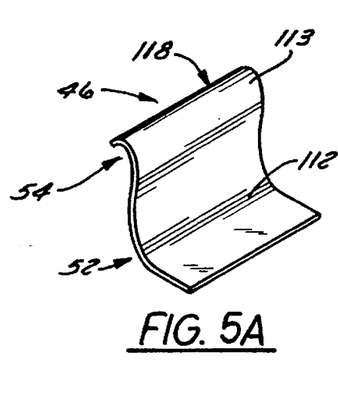
FIG. 5A is a perspective view of a preferred embodiment of a lifting baffle of this invention.
Figure 5B:
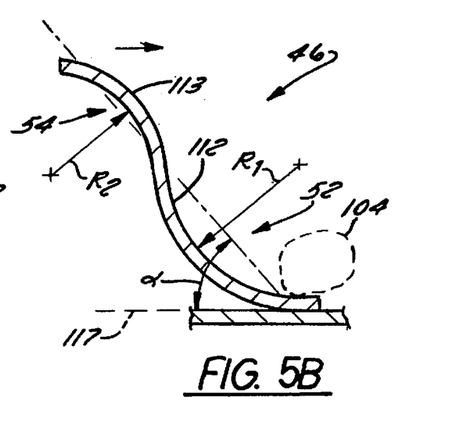
FIG. 5B is a cross sectional view of another preferred embodiment of a lifting baffle of this invention.
Figure 6:
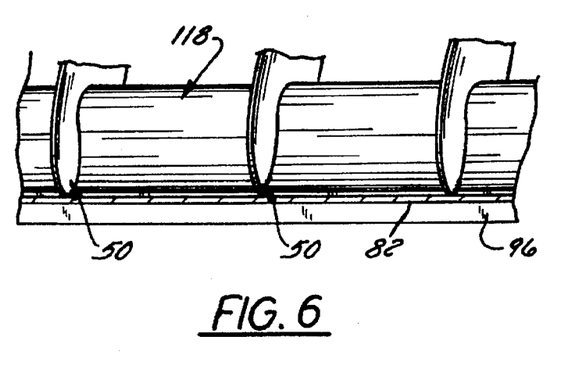
FIG. 6 is a fragmentary perspective view of lifting baffles between adjacent flights of a food product urging auger.

FIGS. 4–6 illustrate in more detail lifting baffles 46 of this invention for lifting and agitating food product 104 immersed in the water 49 in the drum 60. During operation, lifting baffles 46 orbit the center of the drum 60, engaging, lifting, tumbling and thereby agitating food product 104 to improve heat transfer between the food product 104 and the water 49.

Preferably, each lifting baffle 46 moves about the center of the drum 60 substantially in unison with either the auger 44 or the drum 60. If only the auger 44 rotates, each lifting baffle 46 moves preferably substantially in unison with the auger 44. If both the drum 60 and auger 44 rotate substantially in unison, each lifting baffle 46 moves substantially in unison with auger 60 and drum 44.

Referring to FIGS. 5A & 5B, each lifting baffle 46 is of generally non-straight construction having a leading portion 52 and a trailing portion 54, with the leading portion 52 being of non-straight construction for gently contacting food product 104 in the drum 60 as the baffle 46 passes through the water 49 in the drum 60. As is shown in FIGS. 5A & 5B, the leading portion 52 preferably is that portion of the baffle 46 that is adjacent or closest to the drum sidewall 82. The trailing portion 54 of the baffle 46 is connected to and extends further radially inwardly from the leading portion 52.

Preferably, the leading portion 52 of each baffle 46 has a food contacting surface 112 that is non-straight in that it is at least partially curved for minimizing the force of impact with food product 104 during operation of the food processing apparatus 40 to minimize and substantially prevent damage to food product 104 as the food product 104 is lifted and agitated by baffles 46. Preferably, the food product contacting surface 112 of the leading portion 52 is generally concave for helping to impart a tumbling motion to food product coming into contact with lifting baffle 46 while also minimizing the force of impact. For some applications, the food product contacting surface 112 of the leading portion 52 can be convex, such as, for example, where it is desired to impart a different tumbling motion to food product in the path of a lifting baffle 46.

As is shown in FIG. 5B, the leading portion 52 is substantially curved having a radius of curvature, $R_1$. Although the leading portion 52 is preferably substantially continuously curved, it can be constructed from a plurality of flat segments or straight plates joined together and constructed and arranged to form a generally arcuately shaped leading baffle portion 52. Preferably, the radius of curvature, $R_1$, of the leading portion 52 of the baffle 46, where it is of continuously curved construction, is no greater than about one hundred inches and not less than about an inch.

The trailing portion 54 of the lifting baffle 46 can also be of non-straight construction, but can be substantially straight, if desired. In a preferred embodiment of a lifting baffle 46 shown in FIGS. 5A & 5B, the trailing portion 54 preferably also is curved having a bend with a radius of curvature, $R_2$. If desired, the lifting baffle 46 can be constructed having a trailing portion 54 with a relatively small radius of curvature, $R_2$, such as is depicted in FIG. 5A, that can be even smaller than the minimum radius of curvature, $R_1$, of the leading portion 52. Preferably, however, the baffle 46 is constructed having a trailing portion 54 with a larger radius of curvature, $R_2$, such as is depicted in FIG. 5B.

The food product contacting surface 113 of the trailing portion 54 preferably is substantially convex and preferably is generally continuously curved. If desired, the bend or curved portion of the trailing portion 54 can be composed of flat segments or plates joined together in an arcuate formation.

As is depicted in FIG. 5B, each lifting baffle 46 is oriented such that a central longitudinal axis 115 of the lifting baffle 46 is generally acutely angled relative to a tangent 117 to the direction of the rotation of the auger 44. Preferably each baffle 46 is oriented relative to the auger 44 such that its longitudinal axis 115 is inclined at an angle, $\alpha$, that is at least about 10° and no greater than about 80°. Preferably, the angle of baffle inclination, $\alpha$, is dependant upon such factors as the type of food product, how delicate the food product is, the amount of agitation desired to be imparted to the food product, as well as other factors. For most applications, each lifting baffle 46 is preferably inclined at an angle of between about 30° and about 60°.

Although the baffles 46 of the same tank segment are preferably all inclined about the same angle, baffles 46 of the same tank segment can be inclined at different angles relative to each other, if desired. Likewise, lifting baffles 46 of different tank segments can be inclined at different angles. For example, if heating of food product is performed in a first segment and cooling in a second segment, the lifting baffles 46 of the first segment can be inclined at a different angle than the lifting baffles 46 of the second segment, particularly if it has been determined that certain baffle angles work well for maximizing heat transfer when heating and other baffle angles work well when cooling. Routine research and experimentation can be done to determine optimum baffle angles for various loads, operating conditions, etc., both for heating and cooling applications.

The longitudinal axis 115 shown in FIG. 5B is an approximation of such an axis for a non-straight body, such as the lifting baffle 46 depicted. If desired, the axis 115 can be approximated using linear regression to determine a line representative of the baffle axis 115 based upon the cross sectional shape of the lifting baffle 46.

Referring to FIG. 4, in a preferred baffle construction, each lifting baffle 46 is preferably generally S-shaped. To provide the food product contacting surfaces 112 & 113 with more support, each baffle 46 can be constructed with a support leg 114 such as is shown in FIG. 4. The support leg 114 can be attached adjacent the free end of the baffle 46, but can also be attached to a different part of the baffle 46, such as closer to the leading portion 52 of the baffle 46.

As is shown in FIGS. 6 & 7, each baffle 46 extends axially between adjacent pairs of auger flights 50. Preferably, each baffle 46 is affixed or attached to an adjacent auger flight 50, such as by being welded to an adjacent auger flight 50 along an axial edge of the baffle 46. For the baffle embodiments shown in FIGS. 6, 7 & 10, for example, each axial edge of each baffle 46 is welded to each adjacent auger flight 50 so that each baffle 46 moves in unison with rotation of the auger 44 and is supported by each adjacent flight 50.

If desired, the radially outermost edge 118 (FIG. 7 & 10) of each lifting baffle 46 can be affixed or secured to the drum sidewall 82. If each baffle 46 is secured to the drum sidewall 82, it is preferably secured or affixed to a support channel 96 (FIG. 4) and not to a perforate portion of the drum sidewall 82. If a lifting baffle 46 is not secured to an adjacent auger flight 116 it is preferably secured to the drum sidewall 82.

Figure 8:
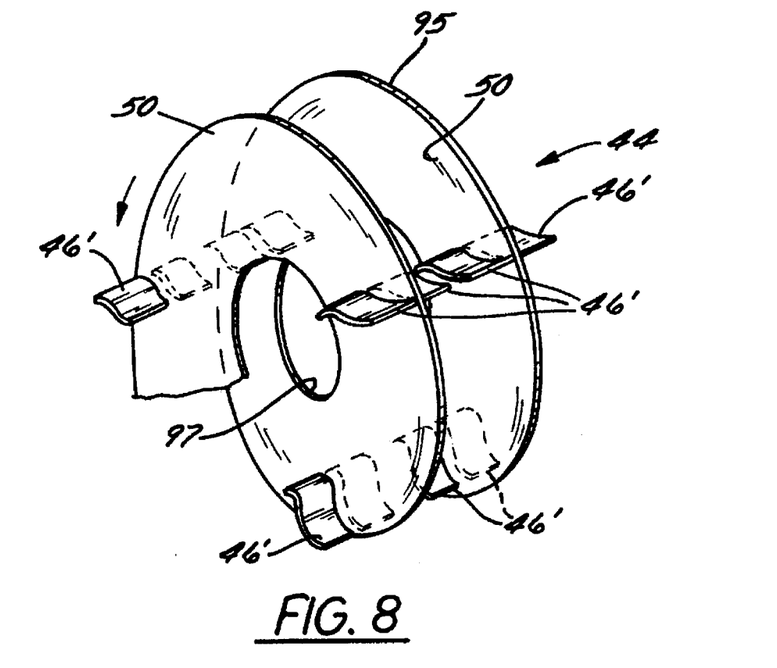
FIG. 8 is a fragmentary perspective view of a third preferred lifting baffle of this invention, with each baffle attached to only a single adjacent auger flight.
Figure 9:
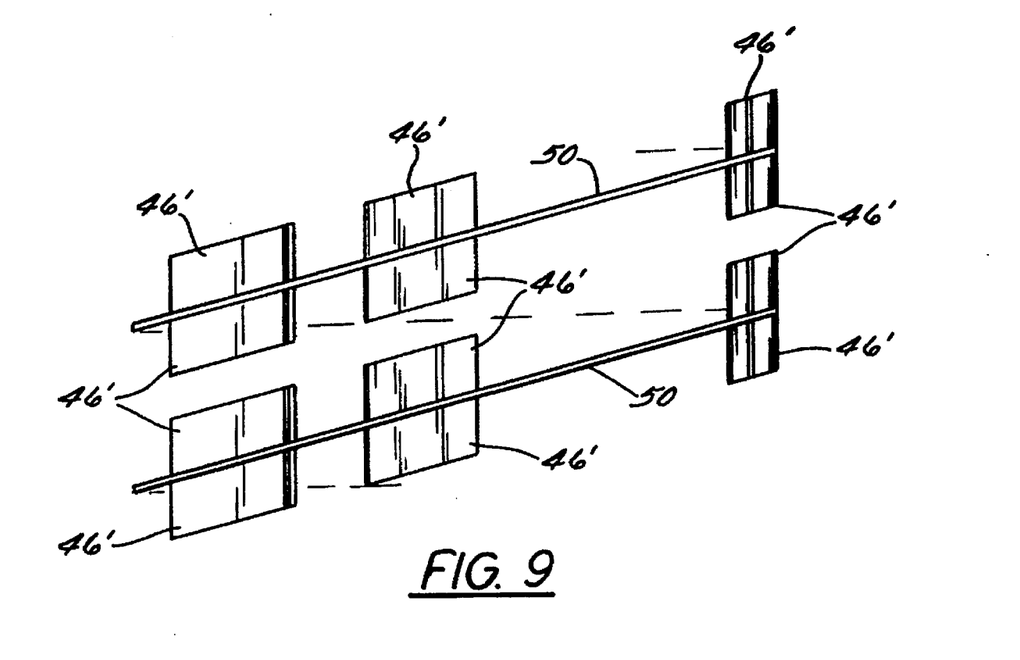
FIG. 9 is a fragmentary top view of the lifting baffles of FIG. 8.

Referring to FIGS. 8 & 9, in another preferred embodiment of the lifting baffle 46' of this invention, each baffle 46' does not extend completely between adjacent auger flights 50, but extends axially from one adjacent auger flight 50 toward another adjacent auger flight 50. As is shown in FIGS. 8 & 9, the free axial edge of each baffle 46'0 terminates short of the other adjacent flight. Although a lifting baffle 46'0 of this construction can be attached to each auger flight 50, a lifting baffle 46'0 of this construction preferably is attached to each side of an auger flight 50, such as is in the manner depicted in FIGS. 8 & 9.

Preferably, a food processing apparatus 40 using lifting baffles 46 has at least one lifting baffle 46 between each pair of adjacent auger flights 50 of a tank/drum segment, such as is depicted in FIG. 1. However, if desired, a food processing apparatus 40 can be constructed that has no lifting baffles 46 between some pairs of adjacent auger flights 50.

As is shown in FIG. 4, lifting baffles 46 are distributed about the periphery of the drum 60. Although the lifting baffles 46 can be randomly spaced about the periphery of the drum 60, the lifting baffles 46 are preferably equiangularly spaced about the periphery of the drum 60. For example, as is depicted in FIG. 4, the lifting baffles 46 are generally equiangularly spaced about 120° from each other. Preferably, the number of lifting baffles 46 and spacing of the baffles 46 are selected so that at least one lifting baffle 46 is in the water bath 49 at all times during operation for helping to maximize heat transfer efficiency. For example, baffles 46 or 46'0 can be spaced 10°, 20°, 30°, 45°, 60°, 90° from each other or the next nearest baffle 46 or 46'0.

Preferably, the width of the baffles 46 is the same as the width between a pair of adjacent auger flights 50. This width is typically can be twelve, fifteen or eighteen inches, depending upon the distance between adjacent auger flights 50. The length of each baffle 46 will vary according to the anticipated load or force that will be placed on each baffle 46 during operation. Typical baffle lengths are, for example, six inches, nine inches or twelve inches and, of course, depend upon anticipated loading of each baffle 46 during operation. Preferably, each baffle 46 is at least about twelve inches in length and can be constructed with a downturned lip, such as is depicted in FIG. 5A, at its free end for preventing damage to food product. In addition to other factors, loading is primarily dependent upon the depth of the water 49 and food product 104 within the drum 60 and the rotational speed of the auger 44.

The angle, α, of each baffle 46 preferably also depends upon the type or rate of heat transfer desired to be achieved. For example, for types of food product 104 or food product pouches 104 requiring greater heat transfer between the water 49 and food product 104, the angle of each baffle 46 will be more aggressive, that is less acutely inclined relative to the tangent to the direction of rotation of the auger 44. The baffle angle, e, will be less aggressive for types of food product 104 that are more sensitive to damage. Typical baffle angles, α, can include, for example, 15°, 30°, 45°, 60° and 90° and are selected depending upon the rate of heat transfer desired, the baffle loading likely to be encountered, and how easily the food product 104 can be damaged.

V. Declumping Rods

Figure 11:
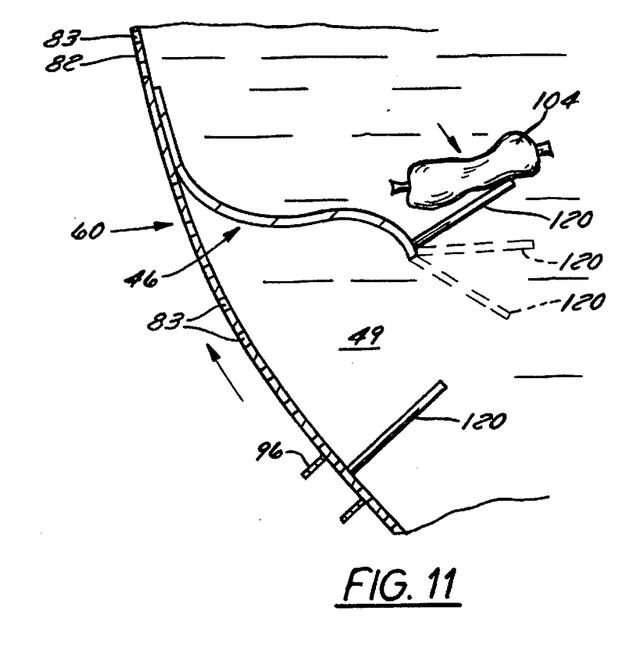
FIG. 11 is a cross sectional view of the lifting baffle and an elongate rod extending radially inwardly from the drum sidewall.

To help separate food product 104, such as for keeping it from clumping together, a food processing apparatus 40 can also be constructed having generally radially inwardly extending elongate rods 120, such as is depicted in FIGS. 10 & 11. These declumping rods 120 further enhance heat transfer by separating food product 104 that is clumped together so that substantially the entire exterior surface area of the food product 104 will be in contact with the water 49 in the drum 60 after being separated thereby helping to maximize heat transfer between the food product 104 and the water 49. The declumping rods 120 are particularly well suited for separating potato food products and the like, such as for example, potatoes that have been spiral cut.

As is shown in FIGS. 10 & 11, declumping rods 120 can be attached to a lifting baffle 46 to help separate food product 104 from other food product 104 as it is agitated by the baffle 46. In one preferred embodiment, declumping rods 120 are attached to a lifting baffle 46 adjacent the free end of the lifting baffle 46. As is shown in phantom in FIGS. 10 & 11, the angle of the rod 120 can be varied. In another preferred embodiment, one or more generally radially inwardly extending rods 120 can be attached to support channels 96 of the drum 60. Preferably, these rods 120 also impart some movement to food product 104 contacting a rod 120 to also agitate food product.

The rods 120 are typically between about 0.375 inches and about 0.5 inches in diameter and vary in length from about one inch to as much as about six inches. The dimensions, angles and spacing of the rods 120 depend upon factors such as the type of food product 104 being processed, whether the food product 104 is a particulate like peas or the like, whether the food product 104 is in pouches as well as the size of each pouch and other factors.

VI. Agitating Baffles

Figure 12:
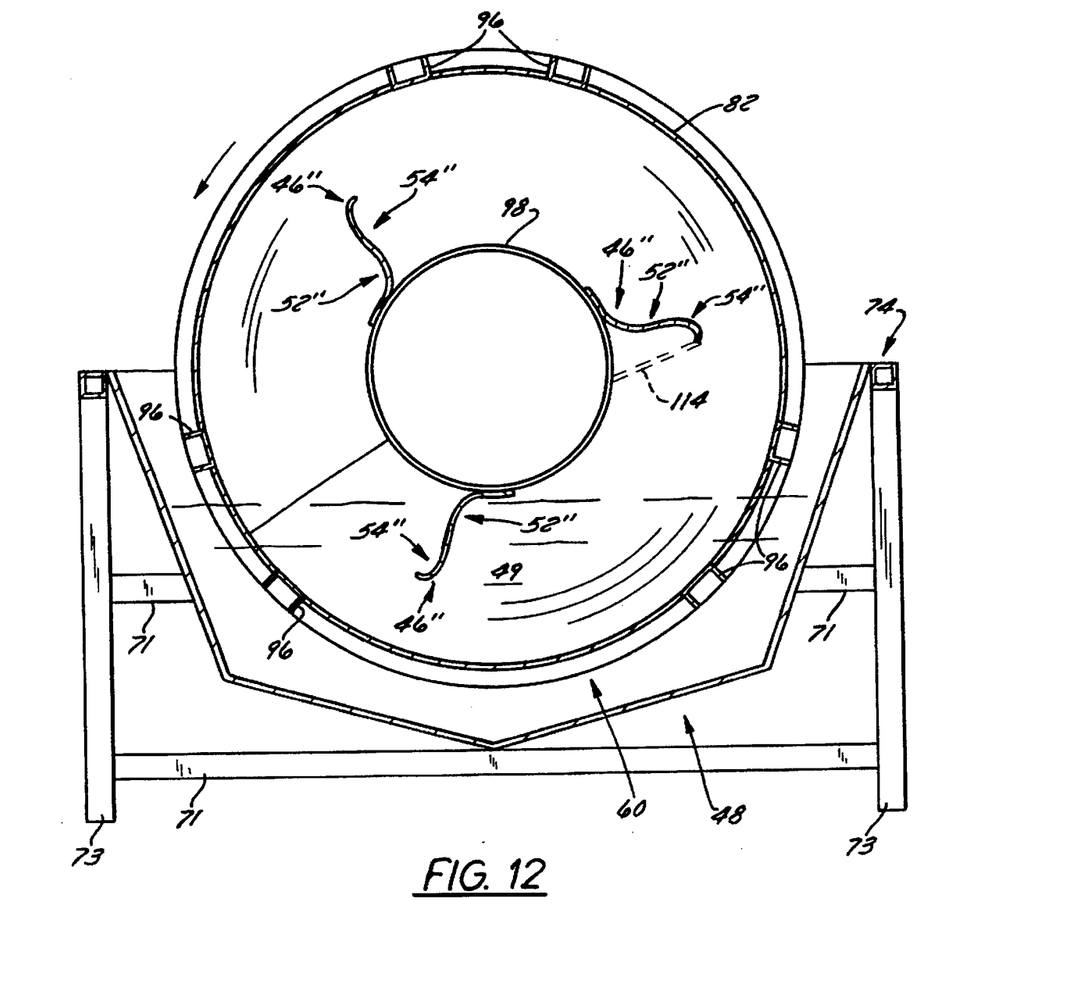
FIG. 12 is a cross sectional view of a food processing apparatus having baffles extending radially outwardly from adjacent a core supporting the auger for agitating the liquid and food product in the drum and tank.

As is shown in FIG. 12, baffles 46"0 of this invention extend generally radially outwardly from adjacent the center of the auger 44 and are used to agitate food product 104 and water 49 in the drum 60 to help improve heat transfer between the food product 104 and water 49. Preferably, each agitating baffle 46" has a leading portion 52" of substantially non-straight construction and a trailing portion 54" with one of the leading or trailing portions having a bend or curve for minimizing the force of impact with food product. Each baffle 46" is generally inclined opposite the direction of rotation of the auger 44 and extends radially outwardly sufficiently far such that at least a portion of each agitating baffle 46" is immersed in water 49 at some point during each rotation of the auger 44.

As is shown in FIG. 12, if the auger 44 has a core 98, each agitating baffle 46" extends generally radially outwardly from adjacent the core 98. Preferably, each agitating baffle 46" can be attached to the core 98 so it is supported by the core 98. If desired, one end of the agitating baffle 46" can be directly attached to the core 98, such as by welding, and the other end of the agitating baffle 46'can be supported by a brace 114 in communication with the core 98, such as is shown in phantom in FIG. 12.

Preferably, each agitating baffle 46" is located between a pair of adjacent auger flights 50 and is connected or affixed to at least one of the adjacent auger flights 50. Preferably, each agitating baffle 46'0 is affixed to both adjacent auger flights, preferably by welding. In this manner, agitating baffles 46" can be used with food processing apparatuses of both cored and coreless construction.

As is shown in FIG. 12, each agitating baffle 46" preferably is generally S-shaped. Preferably, each agitating baffle 46" is of substantially similar construction to the lifting baffles 46.

VII. Use and Operation

A. Use

In use, the food processing apparatus 40 having lifting and/or agitating baffles 46, 46'0 and/or 46"0 of this invention is used to process fruits, vegetables and other food products such as pasta, spaghetti, ravioli, tomato sauce, juices, and the like. Other examples of food products 104 that are typically processed by such an apparatus 40 include corn, beans, peas, carrots, asparagus, tomato sauces, potatoes, french fries and other potato products. The food processing apparatus 40 is well suited for processing food product that is in pouches, such as is depicted more clearly in FIGS. 7, 10 & 11, and is well suited for processing food product 104 such as potatoes that can be directly introduced into the apparatus 40 without being in any pouch.

In the preparation of food product 104 preferably for human consumption, it is of great importance to preserve the integrity and uniformity of each individual piece of food product 104. Nicks, bruises, cuts and other damage to food product are highly undesirable. Pasta, green peas, kidney beans, cut corn, and string beans are some examples of food product 104 that are particularly sensitive to damage from contact with moving equipment parts. The generally non-straight, three dimensionally contoured construction of both the lifting baffles 46 & 46'0 and agitating baffles 46" help minimize the force of impact with food product 104 during operation for minimizing and substantially preventing damage to food product 104 and food product loss.

Preferably, the lifting baffles 46 can be used alone or in combination with agitating baffles 46" and/or declumping rods 120 to help maximize food product heat transfer. Likewise, agitating baffles 46" can be used alone or in combination with lifting baffles 46 and/or 46'0 and/or declumping rods 120. Similarly, declumping rods 120 can be used alone or in combination with lifting or agitating baffles 46, 46'0 and/or 46".

B. Operation

Referring to FIGS. 1 & 2, during operation of the food processing apparatus 40, food product 104 is introduced into the interior of the drum 60 preferably through a chute 130 (shown in phantom in FIG. 2) that feeds the food product 104 into the inlet opening 85 of the drum 60. Upon being introduced into the drum 60, the food product 104 is received in the water bath 49 inside the drum 60 and tank 48.

As the auger 44 rotates, the auger flights 50 urge the food product 104 generally in an axial or longitudinal direction toward the outlet end 58. Factors such as the rotational speed of the auger 44, water temperature, water depth and the length of the drum 60, as well as other factors, help determine the residency time of each piece of food product 104 inside the apparatus 40. Routine testing and experimentation are preferably done to optimize these variables for the type of food product being processed.

When the food product 104 reaches the outlet end 58, the lifting flight 108 lifts the food product 104 out of the water and deposits the food product 104 on the discharge chute 102. Upon being deposited upon the discharge chute 102, the food product 104 preferably slides down the chute 102 and out the outlet. In this manner, food product 104 passes from drum segment to drum segment until it reaches the ultimate end of the drum 60 where the food product 104 is discharged from the food processing apparatus 40.

To demonstrate the versatility of the lifting baffles 46, agitating baffles 46" and declumping rods 120 for both heating and cooling applications, the first drum segment 84 preferably is a blancher and the second drum segment 86 preferably is a chiller. However, it is not intended that the use of the lifting baffles 46, agitating baffles 46" and declumping rods 120 be limited to just these food processing applications.

While the food product 104 is inside the drum 60, lifting baffles 46 gently scoop up and tumble the food product 104 in the water 49, helping to increase heat transfer between the water 49 and food product 104. The movement of the water 49 as it flows over and around the baffles 46 also creates turbulence thereby further enhancing heat transfer.

As a lifting baffle 46 approaches a piece of food product 104, such as the food product received in pouch 104, its inclined and generally curved leading portion 52 makes initial contact with the food product 104 at a relatively sharply acutely inclined angle thereby minimizing the force of impact with the food product/pouch 104. As is shown in FIG. 5B, for food product 104 adjacent the drum sidewall 82, the lifting baffle 46 preferably gently slides between the food product 104 and the drum sidewall 82, acting much like a ramp, resulting in little or virtually no impact at all. Preferably, the concave leading portion 52 of the baffle 46 also captures at least a slight cushioning fluid boundary layer between the food product 104 and baffle 46 to further minimize any impact between food product 104 and baffle 46.

Referring to FIGS. 4, 7, 10 & 11, as the food product 104 moves toward the trailing portion 54 of the baffle 46, it preferably slides, tumbles or rolls along the baffle 46, at least in part due to the relative movement between the food product 104 and baffle 46 and the flow of water 49 on and around the baffle 46. Additionally, as the food product 104 travels along the baffle 46 toward the trailing portion 54, the food product 104 is controllably and gently accelerated to help introduce agitation without damaging the food product 104. Depending upon the size, shape, weight and other characteristics of the food product 104, the food product 104 preferably tumbles off of the trailing portion 54 as it leaves contact with the baffle 46, such as is depicted in FIG. 4.

In addition to the aforementioned operating characteristics of the lifting baffle 46, agitating baffle 46" also helps to improve heat transfer by "dunking" food product 104 that is near the surface of the water 49 to help more fully immerse the food product 104 in the water 49. By more fully immersing food product 104 in the water 49, water 49 preferably contacts substantially the entire exterior surface area of the food product or the food product pouch, thereby helping to maximize heat transfer between the food product 104 and the water 49.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

What is claimed is:

1. A food processing apparatus for heating or cooling food product comprising:
   a) a tank for receiving food product therein and having an inlet end and an outlet end;
   b) a liquid received within the tank;
   c) a food transport mechanism received in the tank for urging food product received in the tank toward the outlet end; and
   d) at least one baffle of non-straight construction in operable communication with the food transport mechanism for agitating food product to increase heat transfer between the liquid in the tank and the food product.

2. The apparatus of claim 1 wherein (a) the food transport mechanism moves to urge food product in the tank toward the outlet end and (b) the baffle (i) has a first bend, (ii) has a second bend, (iii) is of substantially S-shaped cross section, and (iv) is attached to the food transport mechanism for movement substantially in unison therewith.

3. The apparatus of claim 1 wherein the baffle has (a) a leading portion of non-straight construction, (b) a trailing portion of non-straight construction, and (c) is moved during operation to agitate food product in the tank.

4. The apparatus of claim 3 wherein at least one of the non-straight portions of the baffle is curved.

5. The apparatus of claim 4 wherein both non-straight portions of the baffle are curved.

6. The apparatus of claim 5 wherein one of the non-straight portions of the baffle is concavely curved and the other of the non-straight portions of the baffle is convexly curved.

7. The apparatus of claim 6 wherein the baffle is constructed and arranged such that during baffle movement, food product first engages the concavely curved portion of the baffle and thereafter engages the convexly curved portion of the baffle.

8. The apparatus of claim 4 further comprising a pair of spaced apart elongate rods extending outwardly from the trailing portion of the baffle for separating food product.

9. The apparatus of claim 1 wherein (a) the baffle has a first portion and a second portion with one of the portions being of non-straight construction and (b) the food transport mechanism comprises an auger having an axis of rotation with a generally helical food product urging surface extending outwardly from adjacent the axis of rotation and the auger is defined by at least one pair of spaced apart flights constructed and arranged for urging food product toward the outlet end of the tank by rotation of the auger and flights and (c) wherein the baffle is carried by an adjacent auger flight and located between two adjacent auger flights.

10. The apparatus of claim 9 wherein the non-straight portion of the baffle is generally curved for agitating food product coming into contact with the baffle while minimizing impact of the food product with the baffle.

11. The apparatus of claim 10 further comprising an elongate and generally cylindrical sidewall received in the tank and defining a rotatable drum that substantially encloses the auger.

12. The apparatus of claim 11 wherein the auger is connected to the drum sidewall for rotation in unison with the drum.

13. The apparatus of claim 11 wherein the baffle (1) has one end adjacent the drum sidewall, (2) extends generally radially inwardly from the perforated cylinder toward the axis of rotation of the auger, and (3) during auger rotation lifts food product in the liquid to agitate the food product.

14. The apparatus of claim 11 wherein the baffle (1) has one end adjacent the axis of rotation of the auger, (2) extends generally radially outwardly from adjacent the auger axis toward the drum sidewall, and (3) during auger rotation agitates the liquid and food product in the drum.

15. The apparatus of claim 14 wherein the auger further comprises a central core upon which the auger flights are carried and the baffle extends radially outwardly from adjacent the auger core.

16. The apparatus of claim 14 wherein the auger is of coreless construction.

17. The apparatus of claim 11 further comprising an elongated rod extending outwardly from the baffle.

18. The apparatus of claim 11 further comprising a pair of spaced apart and elongate rods extending radially inwardly from the drum sidewall.

19. The apparatus of claim 9 wherein the baffle extends from one of the adjacent auger flights to the other of the adjacent auger flights.

20. The apparatus of claim 9 wherein the baffle (1) is attached to only one of the adjacent auger flights, (2) extends axially toward the other of the adjacent auger flights, and (3) terminates before reaching the other of the adjacent auger flights.

21. The apparatus of claim 13 wherein the baffle is inclined in a direction opposite the direction of auger rotation such that a longitudinal axis of the baffle is acutely angled relative to a tangent to the direction of rotation of the auger.

22. The apparatus of claim 13 wherein the liquid received within the tank is cold water having a temperature of no greater than 70° F. and at least about 32° F.

23. The apparatus of claim 13 wherein the liquid received within the tank is hot water having a temperature of at least 160° F. and no greater than about 212° F.

24. The apparatus of claim 13 wherein (1) the auger comprises a plurality of spaced apart flights that form a helical food transporting surface, (2) the baffle is of generally S-shaped construction, and (3) an S-shaped baffle is located between each pair of adjacent auger flights.

25. A food processing apparatus for heating or cooling food product comprising:
 a) a tank having an inlet end and an outlet end;
 b) a bath of water received within the tank;
 c) an auger rotatably received in the tank and having a plurality of spaced apart generally radially outwardly extending flights, each flight having a radially outer peripheral edge, with the auger flights constructed and arranged to form a generally helical food product urging surface for urging food product received in the tank toward the outlet end; and
 d) a plurality of lifting baffles, each of which extends substantially radially inwardly from adjacent the radially outer peripheral edge of an adjacent auger flight and which is positioned between two adjacent auger flights, so that when the auger rotates, the baffles engage food product received in the tank to agitate the food product, and wherein each baffle has a first portion, a second non-portion, with one of the portions being of non-straight construction, and the non-straight portion being generally curved to minimize impact with food product.

26. The apparatus of claim 25 wherein each lifting baffle has a first non-straight portion and a second non-straight portion with one of the portions being curved or having a bend.

27. The apparatus of claim 25 wherein the auger flights and the lifting baffles are constructed of a stainless steel with each lifting baffle being welded to at least one of the adjacent lifting baffles.

28. The apparatus of claim 26 wherein the first non-straight portion of each lifting baffle comprises a leading portion that extends radially inwardly from adjacent a radially outer peripheral flight edge and which has a food contacting surface that is generally concavely curved for minimizing the impact force of food contacting the baffle.

29. The apparatus of claim 28 wherein the second non-straight portion of each lifting baffle comprises a trailing portion that (1) is connected to the leading portion, (2) extends further radially inwardly from the leading portion, and (3) has a food contacting surface that is generally convexly curved.

30. The apparatus of claim 29 wherein each lifting baffle is inclined relative to the auger in a direction opposite the direction of auger rotation such that a longitudinal axis of the baffle is acutely angled relative to a tangent to the direction of rotation of the auger.

31. The apparatus of claim 25 wherein each flight has an inner radial peripheral edge and further comprising a plurality of generally S-shaped agitating baffles extending radially outwardly from adjacent the inner radial edge of an adjacent auger flight and which is positioned between two adjacent auger flights so that when the auger rotates, the agitating baffles engage water received in the tank to create agitation.

32. The apparatus of claim 31 wherein the auger flights are carried on a generally cylindrical core.

33. The apparatus of claim 32 further comprising an elongate, generally cylindrical perforate sidewall forming a generally cylindrical drum received in the tank that encloses the auger.

34. The apparatus of claim 33 further comprising a dividing baffle received in the tank dividing the tank into two compartments.

35. The apparatus of claim 34 wherein the water received in one of the tank compartments has a temperature of at least about 160° Fahrenheit and no greater than about 212° Fahrenheit for heating food product received in the tank compartment.

36. The apparatus of claim 34 wherein the water received in one of the tank compartments has a temperature of no greater than about 70° Fahrenheit and no greater than about 32° Fahrenheit for cooling food product received in the tank compartment.

37. The apparatus of claim 25 further comprising at least two spaced apart elongate rods extending outwardly from each lifting baffle.

38. A food processing apparatus for heating or cooling food product comprising:

a) a tank having an inlet end and an outlet end;

b) a bath of water received within the tank;

c) an auger rotatably received in the tank and having a plurality of spaced apart generally radially outwardly extending flights, each flight having an inner radial peripheral edge, with the auger flights constructed and arranged to form a generally helical food product urging surface for urging food product received in the tank toward the outlet end;

d) a plurality of agitating baffles, each of which extends substantially radially outwardly from adjacent the inner radial peripheral edge of an auger flight and which is located between two adjacent auger flights so that when the auger rotates, the agitating baffles engage water received in the tank to agitate the water, and wherein each agitating baffle has a first non-straight portion and a second non-straight portion.

39. The apparatus of claim 38 wherein at least one of the non-straight portions of each agitating baffle is curved.

40. The apparatus of claim 39 wherein each agitating baffle is generally S-shaped.

41. The apparatus of claim 38 further comprising an elongate generally cylindrical core carrying the auger.

42. The apparatus of claim 38 further comprising a generally cylindrical perforate sidewall forming a drum received in the tank and enclosing the auger.

43. The apparatus of claim 42 wherein the drum sidewall has an inner radial surface and further comprising a plurality of spaced apart elongate rods extending radially inwardly from the inner radial surface of the drum sidewall.

44. A food processing apparatus for heating or cooling food product comprising:

a) a tank having an inlet end and an outlet end;

b) a bath of water received within the tank;

c) an auger rotatably received in the tank and having a plurality of spaced apart generally radially outwardly extending flights with the auger flights constructed and arranged to form a generally helical food product urging surface for urging food product received in the tank toward the outlet end;

d) a generally cylindrical perforate sidewall forming a drum received in the tank which encloses the auger with the sidewall having an inner radial surface; and e) a plurality of spaced apart elongate rods radially inwardly emanating from the inner radial surface of the drum sidewall for separating food product received in the tank.

45. The apparatus of claim 11 wherein food product comprises a plurality of pieces of food product each contained in a pouch and received in the drum and the baffle minimizes impact with pouched food product for helping to prevent bursting of any of the pouches.

46. The apparatus of claim 45 wherein the baffle lacks a support leg or brace.

47. The apparatus of claim 1 wherein the baffle lacks a support leg (114).

* * * * *